(12) United States Patent
Karikallio

(10) Patent No.: US 11,817,998 B2
(45) Date of Patent: Nov. 14, 2023

(54) AUTOMATED CONFIGURATION DEPLOYMENT IN NETWORK OPERATIONS SYSTEMS

(71) Applicant: Elisa Oyj, Helsinki (FI)

(72) Inventor: Henri Karikallio, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 17/421,775

(22) PCT Filed: Jan. 14, 2020

(86) PCT No.: PCT/FI2020/050024
§ 371 (c)(1),
(2) Date: Jul. 9, 2021

(87) PCT Pub. No.: WO2020/157374
PCT Pub. Date: Aug. 6, 2020

(65) Prior Publication Data
US 2022/0094593 A1 Mar. 24, 2022

(30) Foreign Application Priority Data

Jan. 28, 2019 (FI) ..................................... 20195049

(51) Int. Cl.
*H04L 41/0806* (2022.01)
*G06F 8/65* (2018.01)
(Continued)

(52) U.S. Cl.
CPC ............ *H04L 41/0806* (2013.01); *G06F 8/65* (2013.01); *G06F 9/44505* (2013.01);
(Continued)

(58) Field of Classification Search
CPC ............ H04L 41/0806; H04L 41/0869; H04L 41/0886; H04L 41/22; G06F 8/65; G06F 9/44505
(Continued)

(56) References Cited

U.S. PATENT DOCUMENTS 6,003,082 A * 12/1999 Gampper ............ H04L 63/0281
709/225
6,747,930 B1 * 6/2004 Weldon .................. G11B 19/12
369/84

(Continued)

FOREIGN PATENT DOCUMENTS

CN 104618942 A 5/2015
EP 2445140 B1 10/2013
(Continued)

OTHER PUBLICATIONS

Finnish Patent and Registration Office, Search Report, U.S. Appl. No. 20/195,049, dated Aug. 21, 2019, 2 pages.
(Continued)

*Primary Examiner* — Thu Ha T Nguyen
(74) *Attorney, Agent, or Firm* — ZIEGLER IP LAW GROUP, LLC

(57) ABSTRACT

A computer implemented method for automated configuration deployment in network operations systems of a communication network. The following is performed: receiving a start deployment request, wherein the start deployment request includes identification of a target item and a work definition; starting a process corresponding to the work definition; deleting from the network operations systems any already existing configuration concerning the target item; fetching new configuration for the target item; and deploying the new configuration in the network operations systems.

19 Claims, 4 Drawing Sheets

(51) Int. Cl.
*G06F 9/445* (2018.01)
*H04L 41/0869* (2022.01)
*H04L 41/08* (2022.01)
*H04L 41/22* (2022.01)

(52) U.S. Cl.
CPC ...... *H04L 41/0869* (2013.01); *H04L 41/0886* (2013.01); *H04L 41/22* (2013.01)

(58) Field of Classification Search
USPC .................................................. 709/222, 221
See application file for complete search history.

(56) References Cited

U.S. PATENT DOCUMENTS

| | | | | |
|---|---|---|---|---|
| 9,191,275 | B1* | 11/2015 | Worsley | H04L 41/0803 |
| 9,292,987 | B1* | 3/2016 | Myr | H04L 9/3226 |
| 9,554,061 | B1* | 1/2017 | Proctor, Jr. | H04S 7/00 |
| 10,127,023 | B2* | 11/2018 | Shakespeare | G06F 8/61 |
| 11,747,798 | B2* | 9/2023 | Nixon | G05B 19/4185 |
| | | | | 700/97 |
| 2005/0185607 | A1 | 8/2005 | Svensson et al. | |
| 2007/0005948 | A1* | 1/2007 | Kuhls | G06F 8/65 |
| | | | | 713/1 |
| 2007/0006219 | A1* | 1/2007 | Sinha | G06F 8/61 |
| | | | | 717/174 |
| 2007/0091687 | A1* | 4/2007 | Armstrong | A61N 1/37264 |
| | | | | 365/185.29 |
| 2007/0253723 | A1* | 11/2007 | Fujii | G03G 15/6538 |
| | | | | 399/75 |
| 2007/0268506 | A1* | 11/2007 | Zeldin | H04L 41/0806 |
| | | | | 358/1.13 |
| 2007/0268514 | A1* | 11/2007 | Zeldin | H04L 41/0213 |
| | | | | 358/1.15 |
| 2007/0268515 | A1* | 11/2007 | Freund | H04L 67/34 |
| | | | | 358/1.15 |
| 2007/0268516 | A1* | 11/2007 | Bugwadia | H04L 67/34 |
| | | | | 358/1.15 |
| 2010/0180016 | A1* | 7/2010 | Bugwadia | H04L 41/0869 |
| | | | | 713/168 |
| 2010/0306402 | A1* | 12/2010 | Russell | H04N 21/47205 |
| | | | | 709/230 |
| 2011/0196826 | A1* | 8/2011 | Retief | G06Q 30/02 |
| | | | | 707/E17.005 |
| 2012/0066347 | A1* | 3/2012 | Zhu | H04L 67/06 |
| | | | | 709/219 |
| 2013/0152047 | A1* | 6/2013 | Moorthi | G06F 11/3688 |
| | | | | 717/124 |
| 2016/0048436 | A1* | 2/2016 | Yamazaki | G06F 9/44505 |
| | | | | 713/2 |
| 2017/0011606 | A1* | 1/2017 | Ceccon | G06Q 20/208 |
| 2017/0075669 | A1* | 3/2017 | Charters | G06F 8/60 |
| 2017/0171022 | A1* | 6/2017 | Hamer | H04L 41/0866 |
| 2017/0317877 | A1* | 11/2017 | Rajapakse | H04N 21/47217 |
| 2018/0092021 | A1* | 3/2018 | Li | H04W 40/20 |
| 2018/0146046 | A1* | 5/2018 | Deane | H04L 41/22 |
| 2018/0302781 | A1* | 10/2018 | Lee | H04W 12/069 |
| 2020/0275225 | A1* | 8/2020 | Proctor, Jr. | H04S 7/303 |
| 2021/0256493 | A1* | 8/2021 | Aburaya | G06Q 20/202 |
| 2021/0334363 | A1* | 10/2021 | Kim | G06F 21/54 |
| 2021/0406035 | A1* | 12/2021 | Price | G06F 11/3006 |
| 2022/0365527 | A1* | 11/2022 | Suzuki | G06F 3/0488 |
| 2023/0216738 | A1* | 7/2023 | Woodworth | H04L 41/0816 |
| | | | | 709/220 |

FOREIGN PATENT DOCUMENTS

| | | |
|---|---|---|
| WO | 2011029345 A1 | 3/2011 |
| WO | 2015199595 A1 | 12/2015 |

OTHER PUBLICATIONS

International Search Report and Written Opinion of the International Searching Authority, European Patent Office, Application No. PCT/FI2020/050024, dated Apr. 1, 2020, 13 pages.

* cited by examiner

AUTOMATED CONFIGURATION DEPLOYMENT IN NETWORK OPERATIONS SYSTEMS

TECHNICAL FIELD

The aspects of the disclosed embodiments generally relate to deployment of communication networks.

BACKGROUND

This section illustrates useful background information without admission of any technique described herein representative of the state of the art.

Communication networks evolve constantly as capacity requirements change, operating environment changes and technology advances. When a physical change is made in the network, also network configuration in network operations system, e.g. operations support system, OSS, needs to be changed accordingly, and these changes are preferably done at the same time or nearly at the same time to ensure smooth change. In other words, on-site physical deployment work needs to be performed in synchronization with logical deployment work in network operations systems. The network operations system is a sensitive system that can be accessed and controlled only by authorized personnel. Therefore, personnel are required at the same time at the site and on the network operations system side. The physical change may relate to deployment of a new base station, replacing hardware in an existing base station, or changing physical setup in an existing base station. The changes may involve the whole base station, certain cells of the base station, or only one cell of the base station.

In conventional solutions, there is at least one first person at the site making the physical changes and a second person on network side making the logical changes in the network operations systems. The first and second persons coordinate timing of the changes with each other. In practice there may be 2-4 persons working at the site.

SUMMARY

Various aspects of examples of the disclosed embodiments are set out in the claims.

According to a first example aspect of the disclosed embodiments, there is provided a computer implemented method for automated configuration deployment in network operations systems of a communication network. The method comprises receiving a start deployment request, wherein the start deployment request
comprises identification of a target item and a work definition;
starting a process corresponding to the work definition;
deleting from the network operations systems any already existing configuration concerning the target item;
fetching new configuration for the target item; and
deploying the new configuration in the network operations systems.

In an embodiment the method further comprises reporting completed deployment through a user interface.

In an embodiment the method further comprises providing through the user interface information about parameter values comprised in the deployed configuration.

In an embodiment the method further comprises deactivating the target item prior to deleting any already existing configuration.

In an embodiment the method further comprises reporting completed deactivation through a user interface.

In an embodiment the method further comprises updating the new configuration prior to the deployment.

In an embodiment the method further comprises receiving an initialization request prior to receiving the start deployment request, wherein the initialization request comprises identification of the target item; and updating new configuration associated with the target item in response to said initialization request.

In an embodiment the method further comprises automatically generating the new configuration prior to the deployment.

In an embodiment the method further comprises automatically validating the new configuration against design rules.

In an embodiment the method further comprises validating the new configuration against design rules prior to the deployment.

According to a second example aspect of the disclosed embodiments, there is provided an apparatus comprising a processor and a memory including computer program code; the memory and the computer program code configured to, with the processor, cause the apparatus to perform the method of the first aspect or any related embodiment.

According to a third example aspect of the disclosed embodiments present, there is provided a computer program comprising computer executable program code which when executed by a processor causes an apparatus to perform the method of the first aspect or any related embodiment.

The computer program of the third aspect may be a computer program product stored on a non-transitory memory medium.

Different non-binding example aspects and embodiments of the present disclosure have been illustrated in the foregoing. The embodiments in the foregoing are used merely to explain selected aspects or steps that may be utilized in implementations of the present disclosure. Some embodiments may be presented only with reference to certain example aspects of the present disclosure. It should be appreciated that corresponding embodiments may apply to other example aspects as well.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION OF THE DRAWINGS

Example embodiments of the present disclosure and its potential advantages are understood by referring to FIGS. 1 through 5 of the drawings. In this document, like reference signs denote like parts or steps.

Figure 1:
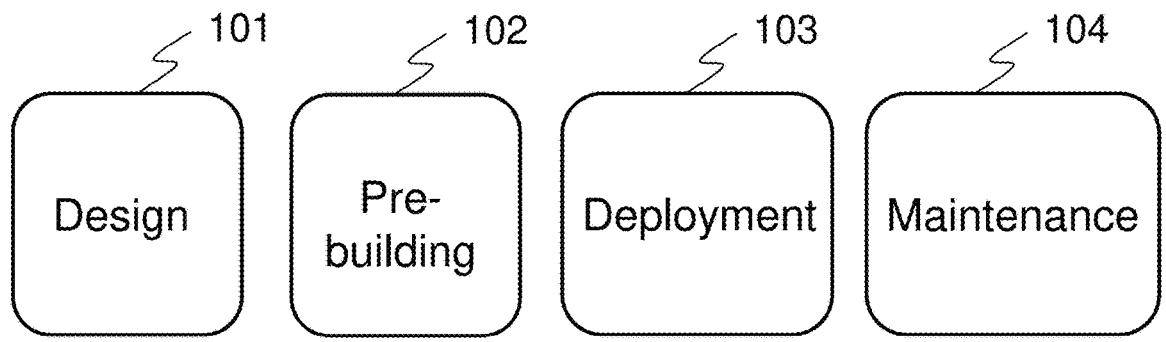
FIG. 1 illustrates a rough network design and deployment process.

FIG. 1 illustrates a rough network design and deployment process for a mobile communication network. The process comprises following phases:

101: Design phase. This phase comprises planning the changes that will be made in the network based on requirements. The planning may comprise decisions concerning the technology that is being used. The planning may involve new sites and/or changes in existing sites. This phase is usually performed well in advance before the actual deployment phase.

102: Pre-building phase: Required physical components are selected and ordered. Additionally, network configuration with selected parameter values may be designed in this phase. The network configuration defines e.g. capacity and service area and other operating parameters of a new cell or base station.

103: Deployment phase: On-site building of the physical components is performed, and the corresponding network configuration is deployed in network operations systems (e.g. in operations support system, OSS). Certain embodiments of the present disclosure enable that designing of the network configuration may be performed in connection with the deployment phase, whereby the configuration may take into account up-to-date situation in the network.

104: Maintenance phase: The network is in use and operation of the network is monitored. Maintenance actions are performed as needed.

The design phase 102 may take place for example 1-3 months before the deployment phase 103. The pre-building phase 102 may take place for example 1-30 days before the deployment phase 103. The deployment phase 103 may last for example 2-8 hours. The maintenance phase 104 starts when the deployment phase 103 is completed and continues from thereon.

Various embodiments of the present disclosure provide automation for the deployment phase 103.

Figure 2:
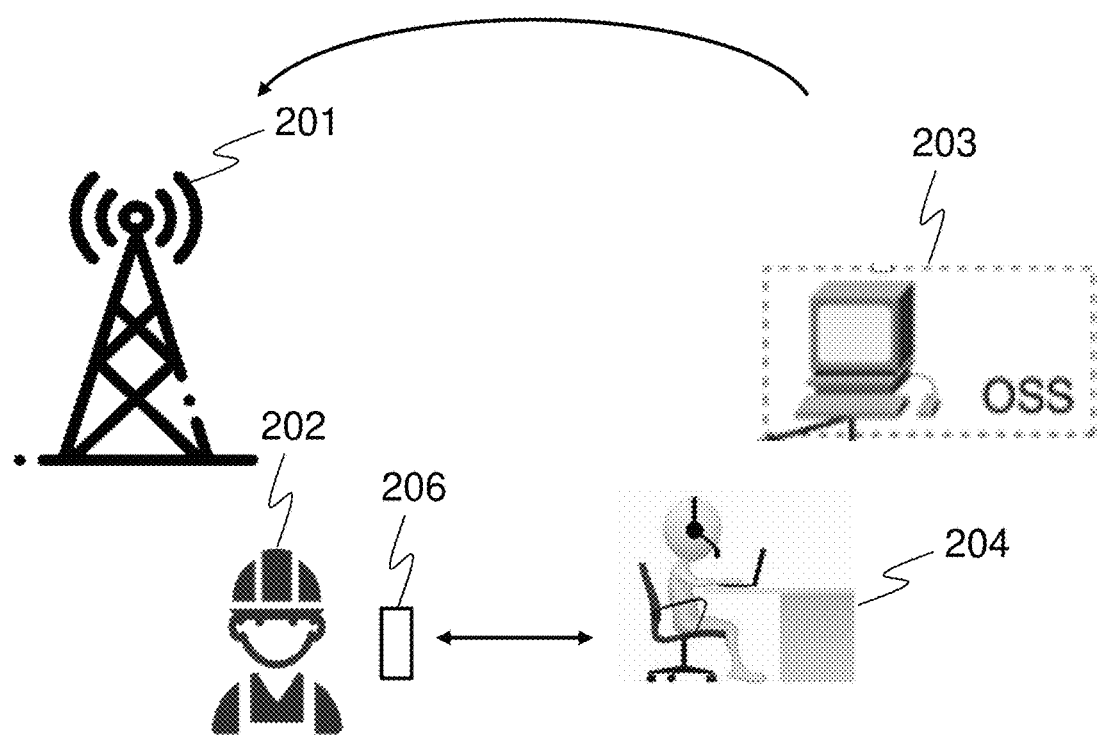
FIG. 2 shows a conventional network deployment scenario.

FIG. 2 shows a conventional network deployment scenario. The scenario shows a base station 201 and a first person 202 with a mobile phone 206 at the site making physical changes in the base station 201 and/or performing physical deployment of the base station 201. Further the scenario shows an operations support system, OSS, 203 depicting network operations systems and a second person 204 taking care of deployment of logical site configuration in the network operations systems. The first person 202 and the second person 204 coordinate timing of the physical and logical deployment with each other e.g. over phone. In practice, the first person 202 and the second person 204 need to be working at the same time and the second person 204 responsible for the deployment in network operations systems may not be able to simultaneously serve first persons at different sites. Any changes made in the network operations system 203 are conveyed to the physical base stations 201 and other network elements of the communication network and the network operates accordingly.

Figure 3:
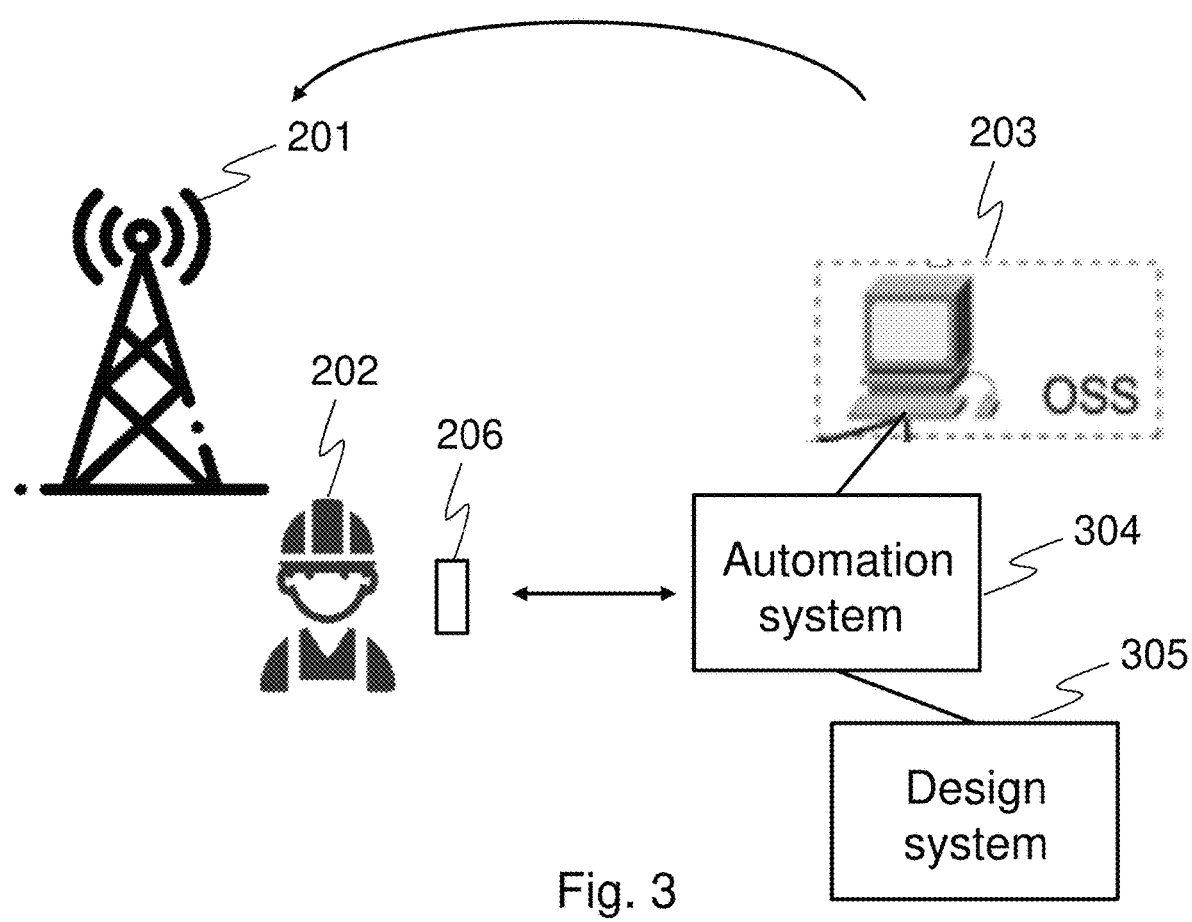
FIG. 3 shows a network deployment scenario according to an embodiment.

FIG. 3 shows a network deployment scenario according to an embodiment. The scenario shows a base station 201 and a first person 202 with a mobile phone 206 at the site making physical changes in the base station 201 and/or performing physical deployment of the base station 201. Further the scenario shows an operations support system, OSS, 203 depicting network operations systems. Still further the scenario shows an automation system 304 and a design system 305. The design system 305, the automation system 304 and the network operations system 203 are communicatively connected to each other. The automation system 304 provides automatic deployment of logical site configuration in the network operations systems 203. Any changes in the network operations system 203 are conveyed to the physical base stations 201 and other network elements of the communication network and the network operates accordingly.

The automation system is operable to obtain relevant network configuration from the design system 305. Additionally or alternatively, the automation system may operable to trigger the design system 305 to automatically generate and/or update the relevant network configuration. The automation system 304 and the design system 305 may be different physical elements or logical elements executed in the same computer hardware. The first person 202 at the site interacts with the automation system 304 via a suitable user interface. The interface may be implemented for example as a web interface or as part of an application running in the mobile phone 206 of the first person 202. The web interface may be implemented in the same device with the automation system or there may be physically and/or logically separate server providing the web interface. The interface may implement suitable access control.

Figure 4:
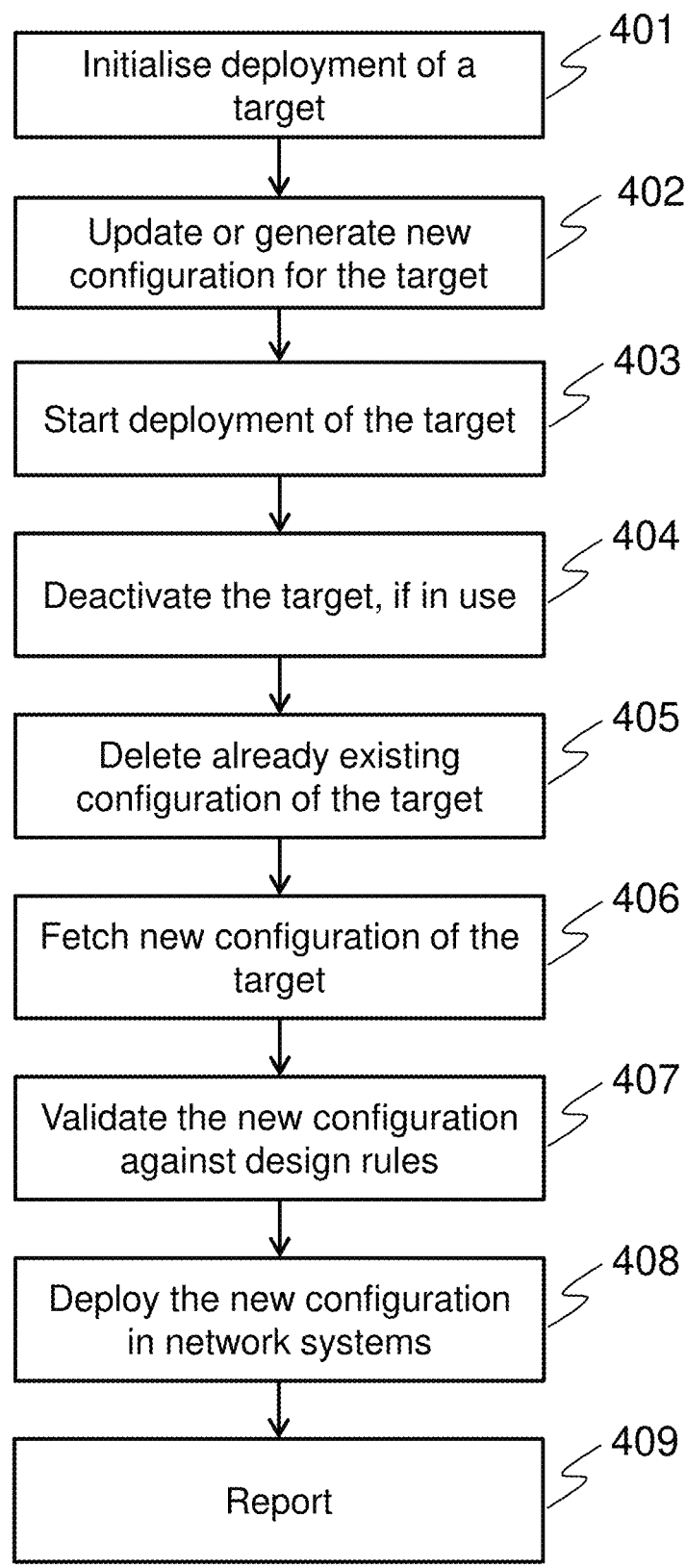
FIG. 4 shows a flow diagrams illustrating example methods according to certain embodiments.

FIG. 4 shows a flow diagram illustrating example methods according to certain embodiments. The shown flow diagram incorporates plurality of embodiments and may be split into parts. The order of phases conducted in the flow chart may be changed expect where otherwise explicitly defined. Furthermore, it is to be noted that performing all phases of the flow chart is not mandatory.

The methods of FIG. 4 may be implemented in the automation system 304 of FIG. 3. In general, the methods are implemented in a computer and do not require human interaction. It is to be noted that the methods are triggered by a human action and may provide output that may be further processed by humans.

The flow chart of FIG. 4 comprises following phases:

Phase 401: Deployment of a target item is initialized. The target item comprises the base station 201 or one or more cells of the base station 201. In an example embodiment the first person 202 at the site triggers the initialization and sends to the automation system 304 an initialization request (e.g. through a user interface). Alternatively, some other person may send the initialization request to the automation system 304. The initialization request comprises identification of the target item. Additionally, the initialization request may identify time frame for the actual deployment. For example, deployments scheduled for certain day may be initialized in the morning of that day, or the deployments scheduled for certain week may be initialized in the beginning of the week.

The initialization request may additionally comprise identification of associated work definition. The work definition comprises information about the physical change that is being made. The work definition may be for example one of the following: deployment of new base station, replacement of existing hardware, changing existing hardware to newer technology, any combination of the foregoing.

Phase 402: Responsive to the initialization request, the automation system 304 triggers updating a previously generated new configuration for the target item. Alternatively, the automation system 304 may trigger automatic generation of a new configuration for the target item. The new configuration may be updated or generated right after receiving the initialization request or the updating or generating may be scheduled for a later time. It may be defined for example that the new configuration will be updated or generated the same day the deployment takes place, e.g. few hours before the deployment. The new configuration may be updated automatically or manually and the updating may take place in the design system 305. By updating or even generating the new configuration relatively close to the actual deployment, it is possible to take into account network changes that may have taken place after the pre-building phase. For example, neighbor relations in the new configuration may be updated to reflect up to date situation in the network. A freshly generated configuration clearly takes into account up to date situation in the network.

Phase 403: The deployment is started. In an example embodiment the first person 202 at the site triggers the deployment and sends to the automation system 304 a request to start deployment (e.g. through the user interface). In an embodiment the request to start deployment comprises identification of the target item and the work definition. The work definition comprises information about the physical change that is being made. The work definition may be for example one of the following: deployment of a new base station, replacement of existing hardware, changing existing hardware to newer technology, any combination of the foregoing.

It is to be noted that it is not mandatory to convey the work definition both in the initialization request and the request to start deployment. One of these may suffice.

Responsive to the request to start deployment the automation system 304 starts a process corresponding to the work definition. In an embodiment there is a data storage comprising process description for different work definitions and the automation system may fetch the process description form such data storage.

Phase 404: The target item is deactivated in a controlled manner in case the target item is in use. After deactivation, a notification of completion of the deactivation phase may be conveyed to the first person 202 through the user interface or through some other communication means. After receiving the notification, the first person 202 may proceed to physically plugging off the target item and performing the physical changes in the target item without causing unexpected problems in user connections in the network.

The deactivation refers to a controlled shut down or locking of the target item (e.g. cell or base station) in the network operations system. The deactivation is so called merciful deactivation, wherein the network operations system moves any users that are being served by the target item to other base stations and cells of the network in a controlled manner. Calls and data connections of the users are moved and after deactivation the deactivated target item does not accept new users (that is, new calls or data connections). After deactivation it is possible to unplug power from the target item without causing disturbance to users of the communication network. Activation is the reverse action wherein the target item is brought up or opened in a controlled manner in the network operations system. After activation, the target item is in normal operating mode and accepts new users (that is, new calls or data connections).

Phase 405: Any already existing configuration concerning the target item is deleted from the network operations systems. By completely deleting the configuration concerning the target item, the updated or generated new configuration for the target item can be built into the network operations system from scratch. In this way, complex changes in existing network configurations are not needed.

It is to be noted that phases 405 and 406 are not always mandatory. For example, if a completely new base station is deployed, these phases may not be needed.

Phase 406: New configuration for the target item is fetched to the automation system 304 e.g. from the design system 305. It is to be noted that this phase may be executed already in connection with phase 402 or 403. Alternatively the generating or updating the new configuration of phase 402 may be implemented in this phase 406, i.e. just before taking the new configuration into use in phase 408.

Phase 407: The new configuration for the target item is validated against design rules. The design rules may for example define certain preferred value ranges for one or more parameters of the configuration. For example, a parameter value may be in the range 1 . . . 10 but not 12 or 15 or 0. If the configuration comprises values that are outside these ranges, an alert may be raised, and the deployment phase may be stopped until the values are fixed. It is to be noted that this phase may be executed already in connection with phase 402 or 403. By performing the validation phase before deploying the new configuration in the network operations systems, it is possible to identify in advance such parameter values (if any) of the new configuration that may cause problems in network operation. In an alternative implementation the validation of phase 407 may be performed in connection with generating or updating the new configuration in phase 402. Alternatively the generating or updating the new configuration of phase 402 may be implemented in this phase 407, i.e. just before taking the new configuration into use in phase 408.

By generating or updating the new configuration in the deployment phase just before taking the new configuration into use, one achieves the benefit of having the new configuration designed based on fresh view on the situation in the network. In this way up to date e.g. neighbor settings and other parameters depending on surrounding network configuration may be defined to correspond to up to date situation.

Phase 408: The parameter values of the new configuration are deployed into the network operations systems (e.g. OSS) and the target item may be activated. In an embodiment, execution of this phase requires confirmation of that the physical changes at the site have been successfully completed and that the target item is ready for being physically plugged in and taken into use.

Phase 409: The deployment on the network side is ready and completion of the deployment is reported. A notification of completion of the deployment may be conveyed to the first person 202 through the user interface or through some other communication means. After receiving the notification, the first person 202 may proceed to physically plugging in the target item. This phase may comprise reporting the parameter values that were deployed in the network enabling further check of the values to be made.

The methods of FIG. 4 provide that the first person 202 at the site is free to choose timing of the deployment without needing to coordinate the timing with the second person 204 of FIG. 2.

Figure 5:
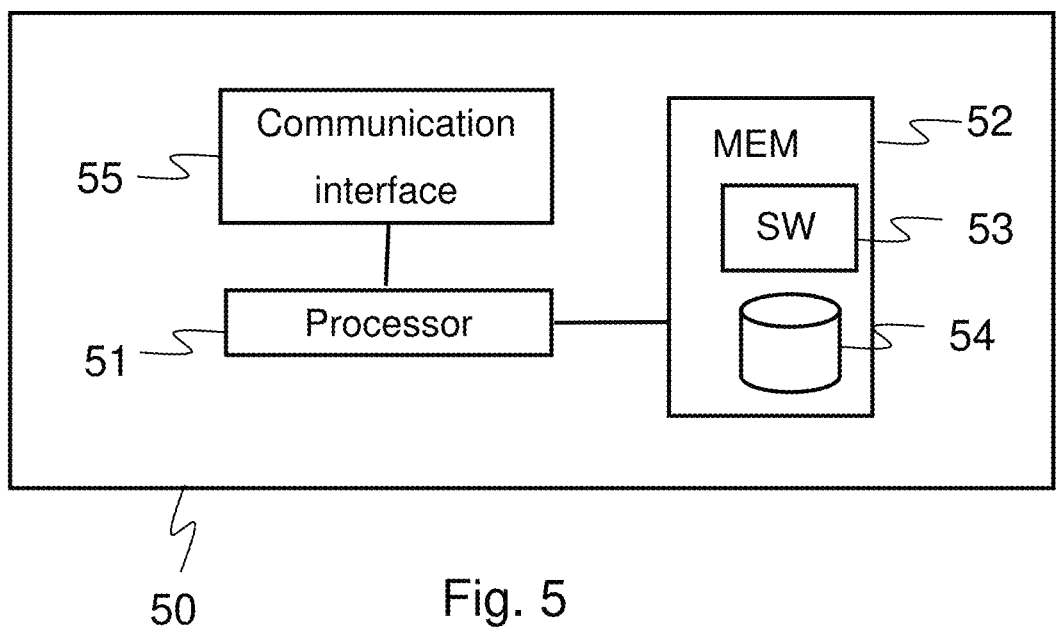
FIG. 5 shows an apparatus according to an embodiment.

FIG. 5 shows an apparatus 50 according to an embodiment. The apparatus 50 is for example a general-purpose computer or server or some other electronic data processing apparatus. The apparatus 50 can be used for implementing embodiments of the present disclosure. That is, with suitable configuration the apparatus 50 is suited for operating for example as the automation system 304 of the foregoing disclosure.

The general structure of the apparatus 50 comprises a processor 51, and a memory 52 coupled to the processor 51. The apparatus 50 further comprises software 53 and database 54 stored in the memory 52 and operable to be loaded into and executed in the processor 51. The software 53 may comprise one or more software modules and can be in the form of a computer program product. The database 54 may be usable for storing e.g. rules and patterns for use in data analysis. Further, the apparatus 50 comprises a communication interface 55 coupled to the processor 51.

The processor 51 may comprise, e.g., a central processing unit (CPU), a microprocessor, a digital signal processor (DSP), a graphics processing unit, or the like. FIG. 5 shows one processor 51, but the apparatus 50 may comprise a plurality of processors.

The memory 52 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 50 may comprise a plurality of memories. The memory 52 may be constructed as a part of the apparatus 50 or it may be inserted into a slot, port, or the like of the apparatus 50 by a user.

The communication interface 55 may comprise communication modules that implement data transmission to and from the apparatus 50. The communication modules may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as Ethernet or universal serial bus (USB), for example. Further the apparatus 50 may comprise a user interface (not shown) for providing interaction with a user of the apparatus. The user interface may comprise a display and a keyboard, for example. The user interaction may be implemented through the communication interface 55, too.

The database 54 may be certain memory area in the memory 52 or alternatively the database 54 may be a separate component or the database 54 may be located in a physically separate database server that is accessed for example through the communication unit 55. The database unit 54 may be a relational (SQL) or a non-relational (NoSQL) database.

A skilled person appreciates that in addition to the elements shown in FIG. 5, the apparatus 50 may comprise other elements, such as microphones, displays, as well as additional circuitry such as memory chips, application-specific integrated circuits (ASIC), other processing circuitry for specific purposes and the like. Further, it is noted that only one apparatus is shown in FIG. 5, but the embodiments of the present disclosure may equally be implemented in a cluster of shown apparatuses.

Without in any way limiting the scope, interpretation, or application of the claims appearing below, a technical effect of one or more of the example embodiments disclosed herein is resource savings. Both human resources and time can be saved as network deployment tasks are automated and human actions are needed only in rare cases.

Another technical effect of one or more of the example embodiments disclosed herein is that improved quality may be achieved. Human errors are reduced as actions are automated and sanity check performed for the site configuration prior to deployment further improves quality. Scheduling configuration update close to the deployment enables that the parameter values that will be deployed reflect up to date situation in the network.

Another technical effect of one or more of the example embodiments disclosed herein is enabling more freedom in timing of performing the physical changes at the site. The automation system on the network side may be always available.

Another technical effect of one or more of the example embodiments disclosed herein is that by removing any existing configuration and performing the deployment from the scratch failures in the automated deployment can be minimized.

If desired, the different functions discussed herein may be performed in a different order and/or concurrently with each other. Furthermore, if desired, one or more of the before-described functions may be optional or may be combined.

Although various aspects of the disclosed embodiments are set out in the independent claims, other aspects of the present disclosure comprise other combinations of features from the described embodiments and/or the dependent claims with the features of the independent claims, and not solely the combinations explicitly set out in the claims.

It is also noted herein that while the foregoing describes example embodiments of the present disclosure, these descriptions should not be viewed in a limiting sense. Rather, there are several variations and modifications, which may be made without departing from the scope of the present disclosure as defined in the appended claims.

The invention claimed is:

1. A computer implemented method, comprising:
receiving a start deployment request, wherein the start deployment request comprises identification of a target item and a work definition, wherein the work definition defines a physical change in a communication network; and
responsive to the start deployment request, automatically performing a configuration deployment in network operations systems of the communication network, comprising the steps of:
starting a process corresponding to the work definition;
deleting from the network operations systems any already existing configuration concerning the target item;
fetching a new configuration for the target item; and
deploying the new configuration in the network operations systems.

2. The method of claim 1, further comprising reporting completed deployment through a user interface.

3. The method of claim 2, further comprising providing through the user interface information about parameter values comprised in the deployed configuration.

4. The method of claim 1, further comprising deactivating the target item prior to deleting any already existing configuration.

5. The method of claim 4, further comprising reporting completed deactivation through a user interface.

6. The method of claim 1, further comprising updating the new configuration prior to the deployment.

7. The method of claim 1, further comprising receiving an initialization request prior to receiving the start deployment request, wherein the initialization request comprises identification of the target item; and updating new configuration associated with the target item in response to said initialization request.

8. The method of claim 1, further comprising automatically generating the new configuration prior to the deployment.

9. The method of claim 1, further comprising automatically validating the new configuration against design rules.

10. The method of claim 1, further comprising validating the new configuration against design rules prior to the deployment.

11. The method of claim 1, wherein the physical change comprises one or more of: deployment of a new base station, replacing hardware in an existing base station, and changing physical setup in an existing base station.

12. An apparatus comprising:
a processor, and
a memory including computer program code; the memory and the computer program code configured to, with the processor, cause the apparatus to:
receive a start deployment request, wherein the start deployment request comprises identification of a target item and a work definition, wherein the work definition defines a physical change in a communication network;
responsive to the start deployment request, automatically perform a configuration deployment in network operations systems of the communication network, comprising the steps of:
start a process corresponding to the work definition;
delete from the network operations systems any already existing configuration concerning the target item;
fetch a new configuration for the target item; and
deploy the new configuration in the network operations systems.

13. The apparatus of claim 12, wherein the apparatus is caused to update the new configuration prior to the deployment.

14. The apparatus of claim 12, wherein the apparatus is caused to receive an initialization request prior to receiving the start deployment request, wherein the initialization request comprises identification of the target item; and to update new configuration associated with the target item in response to said initialization request.

15. The apparatus of claim 12, wherein the apparatus is caused to automatically generate the new configuration prior to the deployment.

16. The apparatus of claim 12, wherein the apparatus is caused to automatically validate the new configuration against design rules.

17. The apparatus of claim 12, wherein the apparatus is caused to validate the new configuration against design rules prior to the deployment.

18. The apparatus of claim 12, wherein the physical change comprises one or more of: deployment of a new base station, replacing hardware in an existing base station, and changing physical setup in an existing base station.

19. A computer program comprising computer executable program code which when executed by a processor causes an apparatus to:
receive a start deployment request, wherein the start deployment request comprises identification of a target item and a work definition, wherein the work definition defines a physical change in a communication network;
responsive to the start deployment request, automatically perform a configuration deployment in network operations systems of the communication network, comprising the steps of:
start a process corresponding to the work definition;
delete from the network operations systems any already existing configuration concerning the target item;
fetch new configuration for the target item; and
deploy the new configuration in the network operations systems.

* * * * *